United States Patent
Otsuka

(10) Patent No.: US 11,342,837 B2
(45) Date of Patent: May 24, 2022

(54) SHORT-CIRCUIT DETERMINATION DEVICE AND SWITCHING POWER SUPPLY DEVICE

(71) Applicant: DENSO CORPORATION, Kariya (JP)

(72) Inventor: Shigeki Otsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 39 days.

(21) Appl. No.: 17/091,130

(22) Filed: Nov. 6, 2020

(65) Prior Publication Data

US 2021/0159778 A1 May 27, 2021

(30) Foreign Application Priority Data

Nov. 25, 2019 (JP) .............................. JP2019-212342

(51) Int. Cl.
*H02M 1/32* (2007.01)
*H02M 1/088* (2006.01)
*H02M 3/158* (2006.01)
*H02M 1/00* (2006.01)

(52) U.S. Cl.
CPC ........... *H02M 1/32* (2013.01); *H02M 1/0006* (2021.05); *H02M 1/088* (2013.01); *H02M 3/158* (2013.01)

(58) Field of Classification Search
CPC ........ H02M 1/32; H02M 3/158; H02M 1/006; H02M 1/38; G01R 31/40; G01R 31/52
See application file for complete search history.

(56) References Cited

U.S. PATENT DOCUMENTS

| | | | |
|---|---|---|---|
| 2007/0019450 A1* | 1/2007 | Tiew | H02M 3/156 363/98 |
| 2011/0058285 A1* | 3/2011 | Wibben | H02M 3/156 361/18 |
| 2014/0092652 A1* | 4/2014 | Kihara | H02M 1/32 363/50 |
| 2019/0149035 A1* | 5/2019 | Kubouchi | H02M 3/158 323/271 |
| 2020/0007034 A1* | 1/2020 | Shiji | H02M 1/32 |
| 2020/0395747 A1* | 12/2020 | Wada | H02M 1/088 |
| 2021/0234454 A1* | 7/2021 | Ishii | H02M 1/0054 |

FOREIGN PATENT DOCUMENTS

JP      4872485 B2      2/2012

* cited by examiner

*Primary Examiner* — Rafael O De Leon Domenech
(74) *Attorney, Agent, or Firm* — Posz Law Group, PLC

(57) ABSTRACT

A short-circuit determination device is provided in a switching power supply device. The switching power supply device converts a power supply voltage applied between an upper power supply line and a lower power supply line and outputs the power supply voltage to a load through an intermediate node. The switching power supply device includes a plurality of upper switching elements and a lower switching element. Each of the plurality of upper switching elements has an electrical conduction terminal and a control terminal. The electrical conduction terminals are connected in series between the upper power supply line and the intermediate node. The control terminals are driven at a same level as each other. The lower switching element has an electrical conduction terminal connected between the lower power supply line and the intermediate node. The lower switching element and the plurality of upper switching elements are connected in series.

8 Claims, 9 Drawing Sheets

SHORT-CIRCUIT DETERMINATION DEVICE AND SWITCHING POWER SUPPLY DEVICE

CROSS REFERENCE TO RELATED APPLICATION

This application is based on Japanese Patent Application No. 2019-212342 filed on Nov. 25, 2019, the disclosure of which is incorporated herein by reference.

TECHNICAL FIELD

The present disclosure relates to a short-circuit determination device and a switching power supply device.

BACKGROUND

A step-down switching power supply device is used by connecting a load between an output terminal and a lower power supply line. The load is also connected between an upper power supply line and the lower power supply line. The switching power supply device is configured by connecting, in series, one switching element on each of an upper side and a lower side of the output terminal.

Each of the upper switching element and the lower switching element has withstand voltage characteristics capable of withstanding a voltage higher than a voltage normally applied. The switching power supply device is provided with a current detection circuit and a voltage detection circuit. The switching power supply device can detect a short-circuit failure or an open fault of each switching element by using the current detection circuit or the voltage detection circuit.

SUMMARY

The present disclosure provides a short-circuit determination device. The short-circuit determination device is provided in a switching power supply device. The switching power supply device converts a power supply voltage applied between an upper power supply line and a lower power supply line and outputs the power supply voltage to a load through an intermediate node. The switching power supply device includes a plurality of upper switching elements and a lower switching element. Each of the plurality of upper switching elements has an electrical conduction terminal and a control terminal. The electrical conduction terminals are connected in series between the upper power supply line and the intermediate node. The control terminals are driven at a same level as each other. The lower switching element has an electrical conduction terminal connected between the lower power supply line and the intermediate node. The lower switching element and the plurality of upper switching elements are connected in series.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
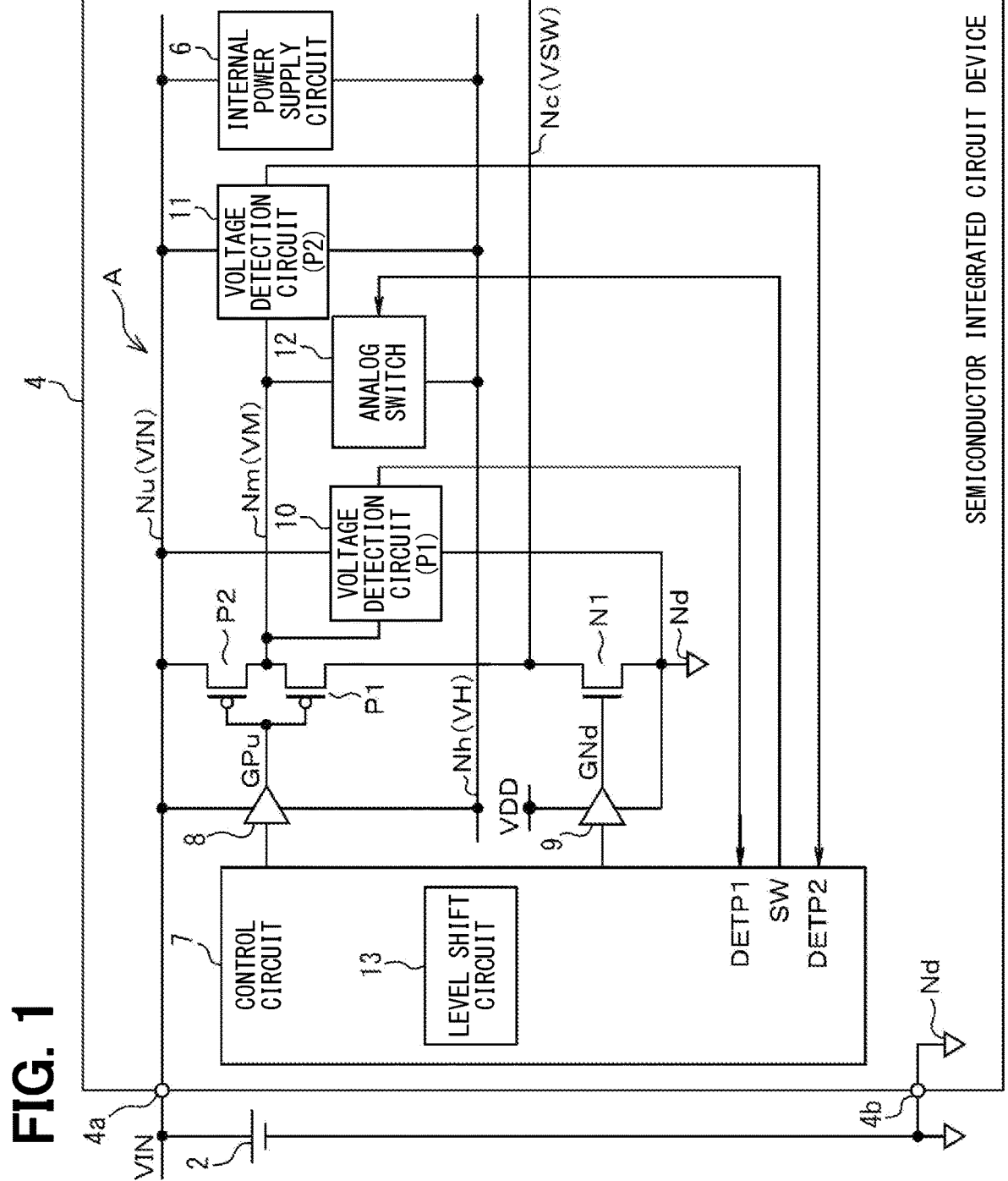
FIG. 1 is an electrical configuration block diagram illustrating a switching power supply device according to a first embodiment.

For example, a failure detection circuit that has been proposed can detect a failure when a switching element on an upper side of a load is short-circuited. However, current continues to flow from an upper power supply line to a lower switching element of the load or the load through the short-circuited upper switching element. This failure state continues until voltage of a voltage source applied to the upper power supply line is lowered or connection between the voltage source and the switching power supply device is disconnected. Since the voltage source continues to apply a high voltage to the switching power supply device, there is a concern that a large amount of power is consumed and the load or the like generates heat.

On the other hand, a technique for connecting a plurality of switching elements on the upper power supply line side and the lower power supply line side of the output terminal in series has been proposed. By using this technique along with using a switching element having a withstand voltage higher than the applied voltage, heat generation under the load or the like can be suppressed. Further, in this case, the switching power supply device can detect short-circuit of the switching element by detecting and monitoring the voltage between the terminals of the switching element.

In order to improve power conversion efficiency due to voltage drop of the upper switching element, the inventors proposed a configuration in which a plurality of upper switching elements are connected in series and a voltage of the same level is applied to control terminals of the plurality of upper switching elements.

For example, the upper switching element connected to the load side among the plurality of upper switching elements may be short-circuited. In this case, when the lower switching element is turned on and the plurality of upper switching elements are turned off, a potential of a common connection point of the plurality of upper switching elements drops to approximately equal to a potential of the lower power supply line. Therefore, the switching power supply device can detect short-circuit of the upper switching element connected to the load side by detecting the voltage at the common connection point of the plurality of upper switching elements by a voltage detection circuit.

However, for example, when an upper switching element different from the upper switching element connected to the load side may be short-circuited, the voltage fluctuation at the common connection point is small regardless of on state or off state of the upper switching element and the lower switching element. Thus, it is difficult to determine short-circuit of the switching element.

The present disclosure provides a short-circuit determination device capable of easily determining short-circuit of an upper switching element when a plurality of upper switching elements are connected in series.

An exemplary embodiment of the present disclosure provides a short-circuit determination device. The short-circuit determination device is provided in a switching power supply device. The switching power supply device converts a power supply voltage applied between an upper power supply line and a lower power supply line and outputs the power supply voltage to a load through an intermediate node. The switching power supply device includes a plurality of upper switching elements and a lower switching element. Each of the plurality of upper switching elements has an electrical conduction terminal and a control terminal. The electrical conduction terminals are connected in series between the upper power supply line and the intermediate node. The control terminals are driven at a same level as each other. The lower switching element has an electrical conduction terminal connected between the lower power supply line and the intermediate node. The lower switching element and the plurality of upper switching elements are connected in series. The short-circuit determination device includes an analog switch and a short-circuit determination unit. The analog switch is connected between a common connection point to which the electrical conduction terminals of the plurality of upper switching elements are commonly connected and a reference potential line having a reference voltage different from a voltage at the upper power supply line and a voltage at the lower power supply line. The short-circuit determination circuit determines a short-circuit of each of the plurality of upper switching elements based on a detection of a potential at the common connection point by biasing the reference voltage to the common connection point by turning on the analog switch in a state where the plurality of upper switching elements are turned off and the lower switching element is turned on.

In the exemplary embodiment of the present disclosure, for example, when the plurality of upper switching elements are operating normally, all the plurality of upper switching elements are turned off. Thus, impedance between the electrical conduction terminals are high. Therefore, the common connection point of the plurality of upper switching elements is biased to the reference voltage by the analog switch.

For example, when the upper switching element on the upper power line side among the plurality of upper switching elements is short-circuited, the potential of the common connection point changes to the power supply voltage applied to the upper power line. Thus, the short circuit determination unit can determine whether the upper switching element of the upper power line side is operating normally or short-circuited by detecting the potential of the common connection point.

For example, when the upper switching element on the load side among the plurality of upper switching elements is short-circuited, the potential of the common connection point changes to approximately the potential of the intermediate node connected to the load. Since the lower switching element is driven on, the potential of the common connection point changes to the applied potential side (for example, the ground potential) of the lower power supply line. Thus, the short circuit determination unit can determine whether the upper switching element of the load side is operating normally or short-circuited by detecting the potential of the common connection point. As described above, the configuration can easily determine whether each of the plurality of upper switching elements connected in series is short-circuited. As a result, the plurality of upper switching elements can be connected in series, and a safe switching power supply device that suppresses an overcurrent due to the short circuit of the upper switching elements can be provided.

Embodiments are described below with reference to the drawings. In each of the embodiments described below, the same or similar reference numerals are attached to the same or similar configuration, and the description is omitted as necessary.

First Embodiment

Figure 2:
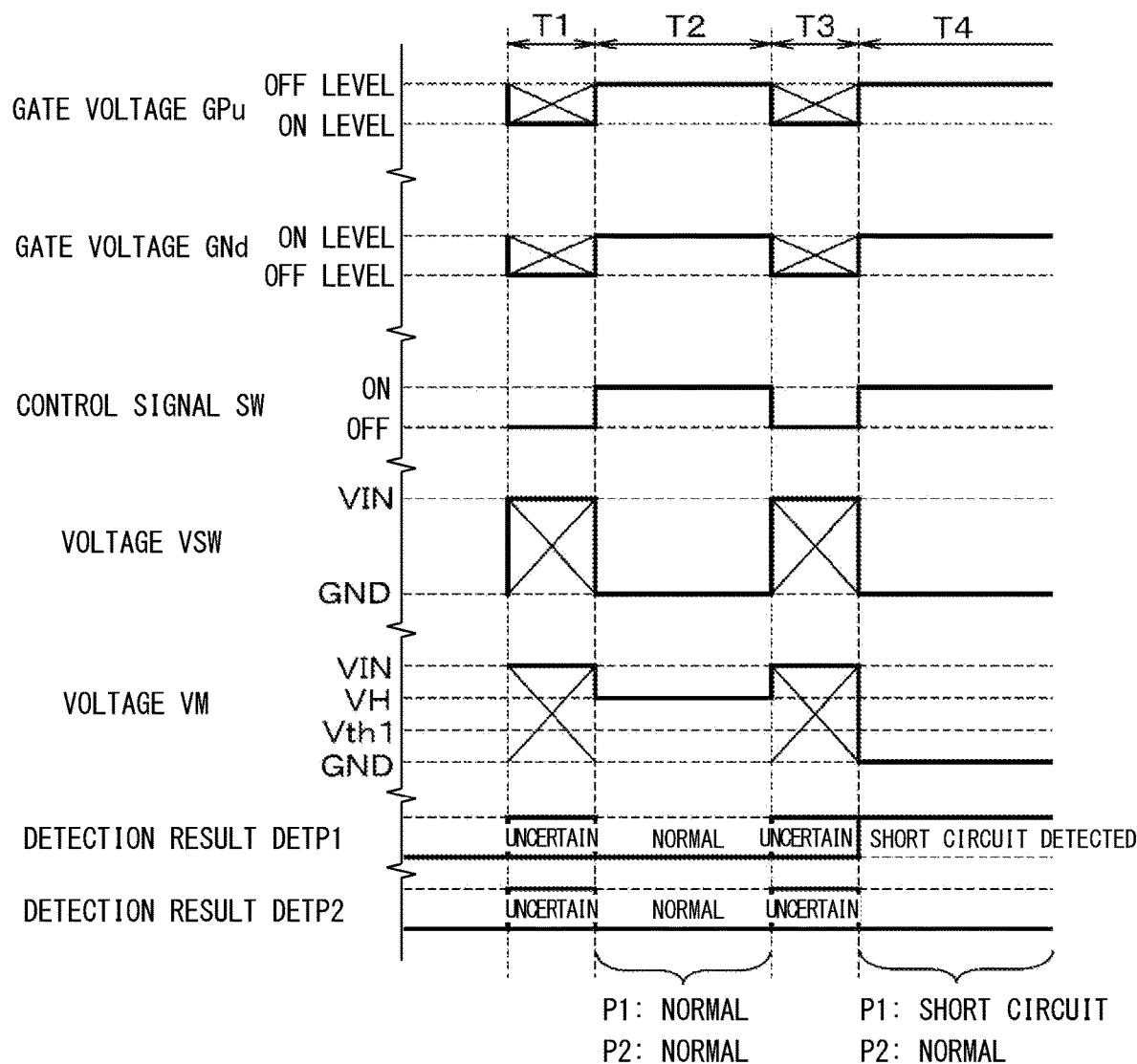
FIG. 2 is a timing chart illustrating signal changes of each part when the upper switching element on the load side is short-circuited in the first embodiment.
Figure 3:
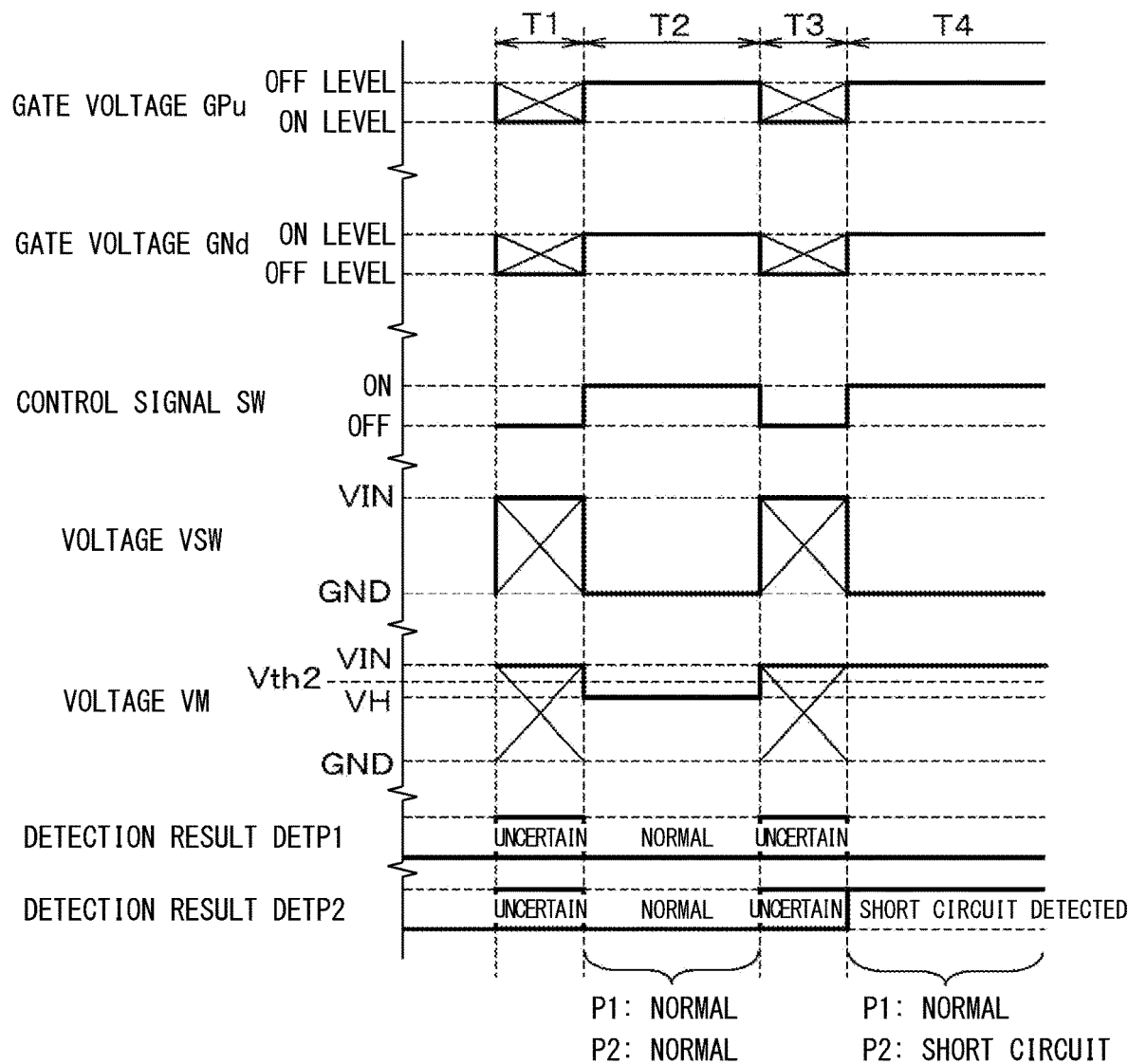
FIG. 3 is a timing chart illustrating signal changes of each part when the upper switching element on the upper power line side is short-circuited in the first embodiment.

FIGS. 1 to 3 are explanatory views of a first embodiment. A switching power supply device 1 shown in FIG. 1 is a step-down chopper type switching power supply device. The switching power supply device 1 supplies a DC power supply voltage, as an output voltage VOUT, obtained by stepping down a power supply voltage VIN input from an external voltage source 2 to a load 3. The switching power supply device 1 includes a semiconductor integrated circuit device 4 and a filter 5.

The semiconductor integrated circuit device 4 inputs the power supply voltage VIN of the voltage source 2 from an input terminal 4a and a ground terminal 4b. The input terminal 4a is connected to an upper power supply line Nu, and the ground terminal 4b is connected to a ground line Nd as a lower power supply line. The switching power supply device 1 converts and outputs the power supply voltage VIN applied between the upper power supply line Nu and the ground line Nd through an intermediate node Nc.

The semiconductor integrated circuit device 4 connects the intermediate node Nc to an output terminal 4c. A filter 5 provided by a reactor L1 and a capacitor C1 is connected to the following stage of the output terminal 4c. A load 3 is connected to the following stage of the filter 5.

The semiconductor integrated circuit device 4 includes various electronic circuit blocks such as an internal power supply circuit 6, a control circuit 7, an upper drive circuit 8, a lower drive circuit 9, a plurality of upper switching elements P1 and P2, a lower switching element N1, voltage detection circuits 10 and 11, an analog switch 12, and the like. A part or all of the electronic circuit blocks constitute the short-circuit determination device A.

The plurality of upper switching elements P1 and P2 are each provided by P-channel MOSFET, and a source and a drain serving as electrical conduction terminals are connected in series. The source and the drain of each of the plurality of upper switching elements P1 and P2 are connected in series between the upper power supply line Nu and the intermediate node Nc. The gates serving as control terminals of the plurality of upper switching elements P1 and P2 are connected to each other, so the plurality of upper switching elements P1 and P2 are driven by the upper drive circuit 8 at the same level as each other. Since the plurality of upper switching elements P1 and P2 connected in series have the same gate applied voltage, the power conversion efficiency due to the voltage drop when the upper switching elements P1 and P2 are electrically conducted can be improved.

The lower switching element N1 is provided by an N-channel MOSFET, and a drain and a source serving as electrical conduction terminals are connected between the intermediate node Nc and the ground line Nd. The source and the drain of the lower switching element N1 are connected in series to the upper switching elements P1 and P2 through the intermediate node Nc. Further, the lower switching element N1 is connected so that the gate serving as the control terminal is driven by the lower drive circuit 9.

The internal power supply circuit 6 is a power supply circuit that generates a DC power supply voltage based on the power supply voltage VIN input to the input terminal 4a. The internal power supply circuit 6 is connected between the upper power supply line Nu and the reference potential line Nh. When the power supply voltage VIN is input between the upper power supply line Nu and the lower power supply line Nd, the internal power supply circuit 6 generates a stable power supply voltage (for example, about several V) based on the power supply voltage VIN and supplies the power supply voltage between the power supply line Nu and the reference potential line Nh. A voltage different from each applied voltage (VIN, GND in this embodiment) of the upper power supply line Nu and the ground line Nd is applied to the reference potential line Nh. In the present embodiment, the reference potential line Nh is used as a lower drive power supply line (corresponding to a third drive power supply line) of the drive power supply applied to the upper drive circuit 8 that drives the gates of the upper switching elements P1 and P2.

The upper drive circuit 8 operates by using the power supply voltage of the internal power supply circuit 6 applied between the upper power supply line Nu and the reference potential line Nh. The upper drive circuit 8 generates potential of high-level or low-level for driving the upper switching elements P1 and P2 based on the control signal input from the control circuit 7, and drives the gates of the upper switching elements P1 and P2.

The lower drive circuit 9 operates by using a regulated power supply voltage VDD generated by a regulated power supply circuit (not shown). The lower drive circuit 9 generates potential of high level or low level for driving the lower switching element N1 based on the control signal input from the control circuit 7, and drives the lower switching element N1.

The analog switch 12 is connected between a common connection point Nm and the reference potential line Nh to which the reference voltage VH is applied. The common connection point Nm connects the drain of the upper switching element P1 and the source of the upper switching element P2. The drain and the source correspond to an electrical conduction terminal. The analog switch 12 is controllable to on or off based on the control signal input from the control circuit 7. The analog switch 12 is a switch in which an impedance value larger than the impedance value (impedance at the time of short-circuit) assuming that the upper switching element P1 or the upper switching element P2 is short-circuited when the power is turned on is set in advance.

The voltage detection circuit 10 is configured by using a comparator (not shown) operated by a power supply voltage VIN applied between the upper power supply line Nu and the ground line Nd. The voltage detection circuit 10 detects the voltage VM at the common connection point Nm of the drains and sources of the plurality of upper switching elements P1 and P2, thereby outputting, to the control circuit 7, a detection result DETP1 that is a result of comparing the voltage VM with the predetermined threshold voltage Vth1 (provided that the ground voltage<the threshold voltage Vth1<the reference voltage VH). The voltage detection circuit 10 is provided for determining short-circuit of the upper switching element P1.

The voltage detection circuit 11 is configured by using a comparator (not shown) operated by the power supply voltage of the internal power supply circuit 6 applied between the upper power supply line Nu and the reference potential line Nh. The voltage detection circuit 11 detects the voltage VM at the common connection point Nm of the drains and sources of the plurality of upper switching elements P1 and P2, thereby outputting, to the control circuit 7, a detection result DETP2 that is a result of comparing the voltage VM with the predetermined threshold voltage Vth2 (provided that the power supply voltage VIN>the threshold voltage Vth2>the reference voltage VH). The voltage detection circuit 11 is provided for determining short-circuit of the upper switching element P2.

The control circuit 7 incorporates a level shift circuit 13. The control circuit 7 executes a predetermined control logic. The control circuit 7 functions as a short-circuit determination unit according to the present disclosure.

The control circuit 7 adjusts the output level to the upper drive circuit 8 according to the drive input level of the upper drive circuit 8 by the level shift circuit 13. The control circuit 7 applies the on-level signal or off-level signal for the upper switching elements P1 and P2 to the gates of the upper switching elements P1 and P2 by using the upper drive circuit 8, thereby turning on or off the upper switching elements P1 and P2 almost at the same time. Further, the control circuit 7 applies the on-level signal or off-level signal to the gate of lower switching element N1 using the lower drive circuit 9, thereby turning on or off the lower switching element N1.

The normal operation and the operation at the time of short-circuit determination of the above configuration will be described.

As shown in FIG. 2, during the normal operation periods T1 and T3, the control circuit 7 complementarily turns on and off the upper switching elements P1 and P2 and the lower switching element N1 while keeping the analog switch 12 in the off state. When the control circuit 7 drives the upper switching elements P1 and P2 on and drives the lower switching element N1 off, the filter 5 and the load 3 are electrically conducted from the upper power supply line Nu through the upper switching elements P1 and P2. When the control circuit 7 drives the upper switching elements P1 and P2 off and drives the lower switching element N1 on, a reflux current is conducted between the lower switching element N1 and the filter 5. The control circuit 7 controls the on/off drive of the upper switching elements P1 and P2 and the lower switching element N1 by pulse control (for example, PWM control), so that the output voltage VOUT output to the load 3 can be controlled to a target voltage different from the power supply voltage VIN. The target voltage may be lower than the power supply voltage VIN.

During the short-circuit determination periods T2 and T4, as shown in FIG. 2, the control circuit 7 sets the gate voltage GPu of the upper switching elements P1 and P2 to off level, so that the control circuit 7 drives the plurality of upper switching elements P1 and P2 off, and the control circuit 7 sets the gate voltage GNd of the lower switching element N1 to on level, so that the control circuit 7 drives the lower switching element N1 on.

The control circuit 7 changes the analog switch 12 from the off state to the on state. When the analog switch 12 is turned on, the reference voltage VH is applied to the common connection point Nm.

In this state, the control circuit 7 inspects whether the plurality of upper switching elements P1 and P2 are operating normally on and off, and whether any of the upper switching elements P1 and P2 is short-circuited. When the plurality of upper switching elements P1 and P2 are normally operating, as shown in the short-circuit determination period T2, the upper switching elements P1 and P2 are all normally off. Thus, the voltage VM at the common connection point Nm is approximately equal to the reference voltage VH.

However, as shown in the short-circuit determination period T4, when the upper switching element P1 on the load 3 side is short-circuited between the source and drain for some reason, the voltage VM at the common connection point Nm is changed to be approximately equal to the potential of the intermediate node Nc. Since the lower switching element N1 is tuned on during the short-circuit determination period T4, the potential of the intermediate node Nc changes to be approximately equal to the ground potential. Therefore, when the voltage detection circuit 10 detects that the voltage VM at the common connection point Nm is changed from the reference voltage VH to ground potential by comparing the voltage VM at the common connection point Nm with the threshold voltage Vth1, the voltage detection circuit 10 outputs the detection result DEPT1 indicating that the voltage VM at the common connection point Nm is changed from the reference voltage VH to ground potential. With the detection result DEPT1, the control circuit 7 can determine that the upper switching element P1 is short-circuited.

In particular, since the impedance when the upper switching element P1 is short-circuited is set lower than the impedance when the analog switch 12 is electrically conducted, the voltage VM at the common connection point Nm changes significantly from the reference voltage VH to the ground potential. Therefore, the voltage detection circuit 10 can easily detect a change in the voltage VM at the common connection point Nm.

Further, as shown in FIG. 3, when the upper switching element P2 on the upper power supply line Nu side is short-circuited between the source and drain for some reason, the voltage VM at the common connection point Nm is changed to be equal to the power supply voltage VIN by the upper switching element P2. Therefore, when the voltage detection circuit 11 detects that the voltage VM at the common connection point Nm is changed from the reference voltage VH to the power supply voltage VIN by comparing the voltage VM at the common connection point Nm with the threshold voltage Vth2, the voltage detection circuit 11 outputs the detection result DEPT2 indicating that the voltage VM at the common connection point Nm is changed from the reference voltage VH to the power supply voltage VIN. With the detection result DEPT2, the control circuit 7 can determine that the upper switching element P2 is short-circuited.

In particular, since the impedance when the upper switching element P2 is short-circuited is set lower than the impedance of the analog switch 12, the voltage VM at the common connection point Nm changes significantly from the reference voltage VH to the power supply voltage VIN. Therefore, the voltage detection circuit 11 can easily detect a change in the voltage VM at the common connection point Nm.

When the control circuit 7 determines that the upper switching element P1 or P2 is short-circuited, the control circuit 7 applies an off-level to the gates of the upper switching elements P1 and P2 and the lower switching element N1 to stop the drive of the upper switching elements P1 and P2 and the lower switching element N1. As a result, the electrical conduction flowing inside the switching power supply device 1, that is, the semiconductor integrated circuit device 4 can be cut off, and safety can be maintained.

(Effect of Present Embodiment)

As described above, according to the short-circuit determination device A of the switching power supply device 1 of the present embodiment, in a state where the plurality of upper switching elements P1 and P2 are driven off and the lower switching element N1 is driven on, the analog switch 12 is turned on. In this configuration, the reference voltage VH is biased to the common connection point Nm of the plurality of upper switching elements P1 and P2, and the short-circuit of the plurality of upper switching elements P1 and P2 is determined.

For example, when the upper switching element P1 is short-circuited between the source and drain, the voltage VM at the common connection point Nm changes to the potential of the intermediate node Nc. Since the lower switching element N1 is driven on, the potential of the common connection point Nm changes to the ground potential of the ground line Nd. The control circuit 7 can determine whether the upper switching element P1 is operating normally or is short-circuited by detecting the potential of the common connection point Nm.

For example, when the upper switching element P2 is short-circuited between the source and drain, the voltage VM at the common connection point Nm changes to the power supply voltage VIN applied to the upper power supply line Nu. The control circuit 7 can determine whether the upper switching element P2 is operating normally or is short-circuited by detecting the potential of the common connection point Nm.

The short-circuit of the upper switching elements P1 and P2 connected in series can be easily detected. As a result, the upper switching elements P1 and P2 can be connected in series, and a safe switching power supply device 1 that suppresses an overcurrent due to the short-circuit of the upper switching elements P1 or P2 can be provided.

As a result, the step-down switching power supply device 1 in which the upper switching elements P1 and P2 are connected in series can suppress a decrease in the power conversion efficiency. In addition, the configuration can easily determine whether any of the upper switching elements P1 and P2 is short-circuited.

As a result, the control circuit 7 executes a fail-safe process to deal with the abnormal state, so that the safe switching power supply device 1 can be provided in which the overcurrent does not continue to flow to the lower switching element N1 and the load 3.

Further, the reference potential line Nh is used as the lower drive power supply line Nh of the drive power supply applied to the upper drive circuit 8 that drives the gates of the upper switching elements P1 and P2, and the analog switch 12 is connected between the common connection point Nm of the upper switching elements P1 and P2 and the drive power supply line Nh. Therefore, the reference voltage VH which is a bias for determining short-circuit can be appropriately applied to the common connection point Nm.

In particular, when the switching power supply device 1 is a step-down type, the power supply voltage VIN is higher than the normal output voltage VOUT. Therefore, when the upper switching element P1 or P2 is short-circuited, a large current tends to flow through the lower switching element N1, the load 3, and the like. However, by using the short-circuit determination shown in the present embodiment, it can be easily determined that the upper switching element P1 or P2 is short-circuited. When it is determined that the upper switching element P1 or P2 is short-circuited, the control circuit 7 stops the drive of the upper drive circuit 8 and the lower drive circuit 9. Thus, the electrical conduction current to the lower switching element N1, the load 3, and the like can be immediately cut off. As a result, safety can be ensured.

Second Embodiment

Figure 4:
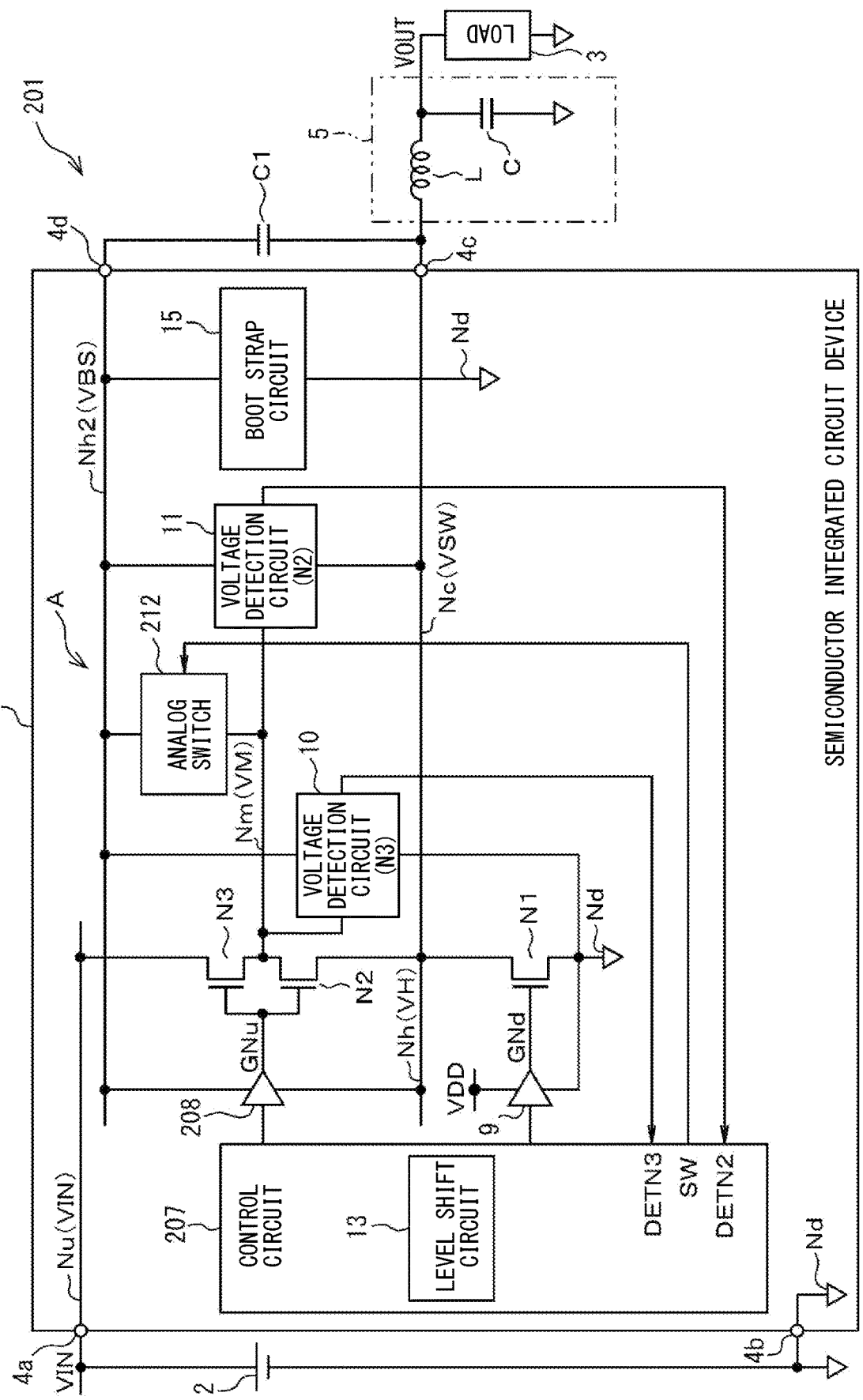
FIG. 4 is an electrical configuration block diagram illustrating a switching power supply device according to a second embodiment.
Figure 5:
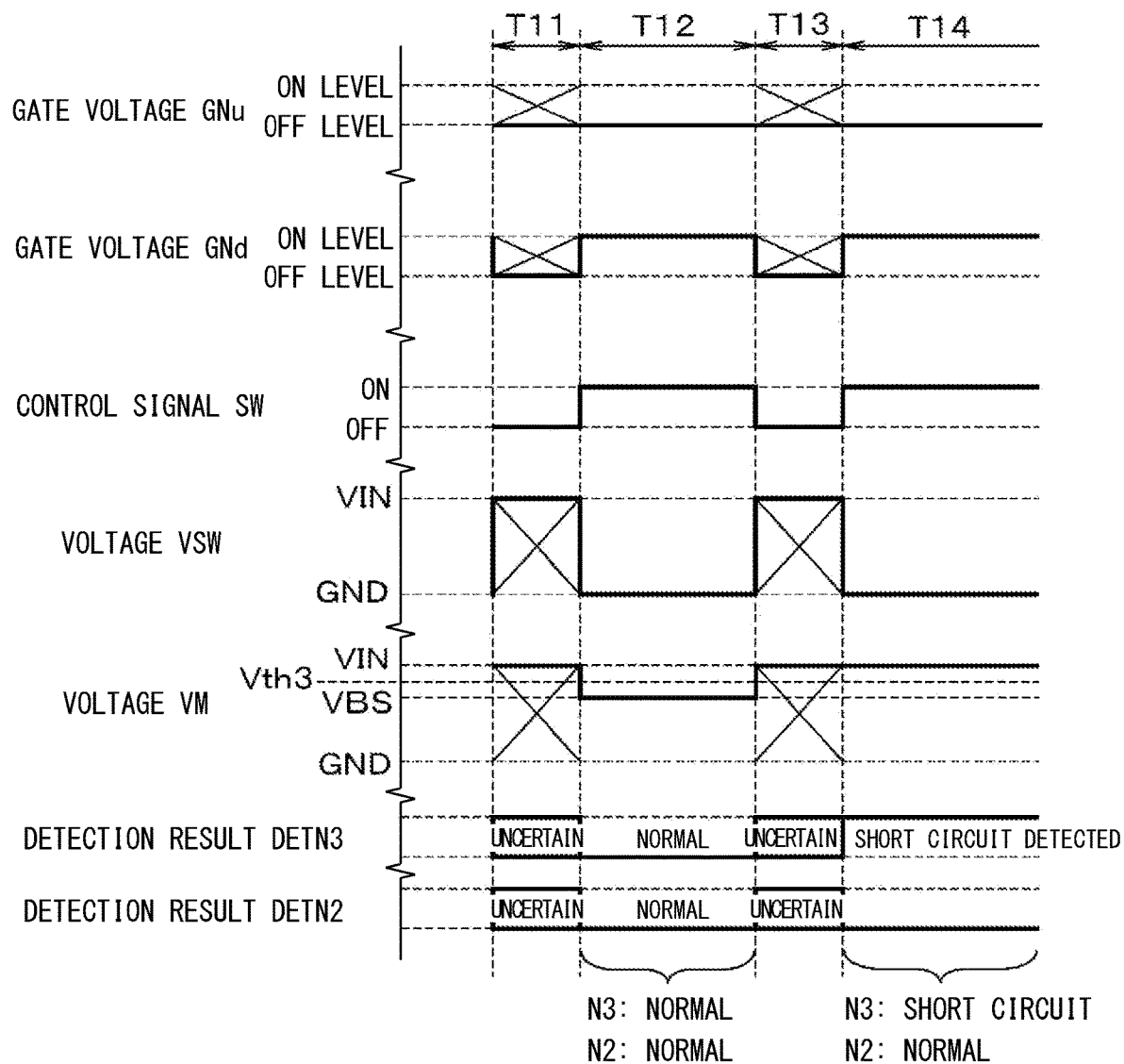
FIG. 5 is a timing chart illustrating signal changes of each part when the upper switching element on the upper power line side is short-circuited in the second embodiment.
Figure 6:
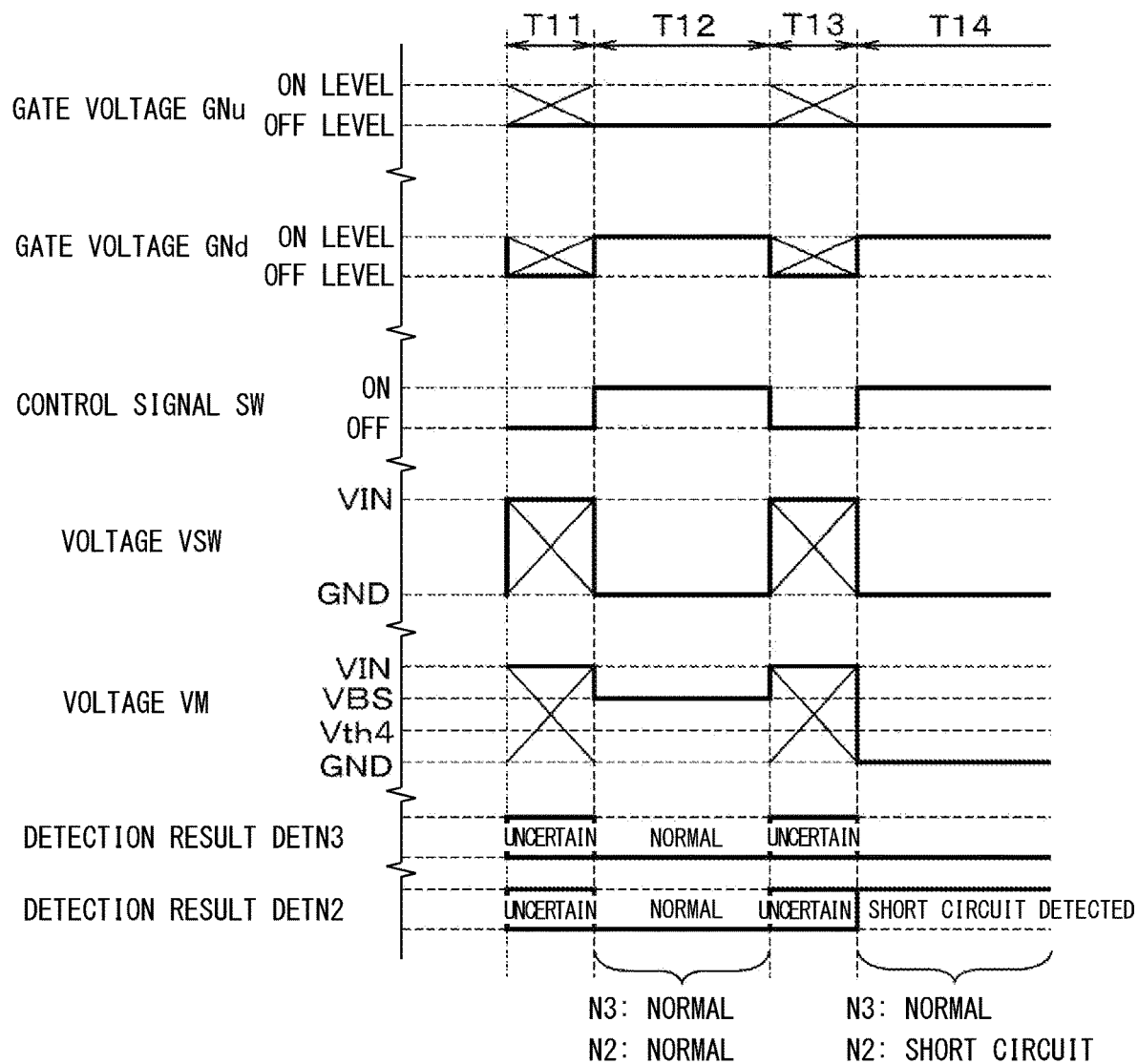
FIG. 6 is a timing chart illustrating signal changes of each part when the upper switching element on the load side is short-circuited in the second embodiment.

FIGS. 4 to 6 are explanatory views of a second embodiment. In the following description, the same parts as those in the first embodiment will be designated by the same reference numerals, description thereof will be omitted as necessary, and parts different from those in the first embodiment will be described. The switching power supply device 201 of the second embodiment includes a semiconductor integrated circuit device 204 and the filter 5.

As shown in FIG. 4, the semiconductor integrated circuit device 204 includes various electronic circuit blocks such as a control circuit 207, an upper drive circuit 208, the lower drive circuit 9, a plurality of upper switching elements N2 and N3, the lower switching element N1, the voltage detection circuits 10 and 11, an analog switch 212, a bootstrap circuit 15, and the like. A part or all of the electronic circuit blocks constitute the short-circuit determination device A.

The plurality of upper switching elements N2 and N3 are provided by N-channel MOSFETs. The sources and drains serving as electrical conduction terminals are connected in series between the upper power supply line Nu and the intermediate node Nc. The gates serving as control terminals of the plurality of upper switching elements N2 and N3 are connected to each other, so the plurality of upper switching elements N2 and N3 are driven by the upper drive circuit 208 at the same level as each other. In the present embodiment, since the upper switching elements N2 and N3 are provided by N-channel MOSFETs, the on-resistance can be decreased and the power loss can be reduced as compared with the case where the upper switching elements N2 and N3 are provided by P-channel MOSFETs as described in the first embodiment.

The built-in bootstrap circuit 15 is a circuit that generates a high-voltage drive power supply by using a power supply voltage VIN or another drive power supply, although the power supply conduction path is not shown. The bootstrap circuit 15 generates a high-voltage drive power supply using an external capacitor C1 provided between the bootstrap terminal 4d and the output terminal 4c as an auxiliary. The bootstrap circuit 15 supplies the boost voltage VBS of the high-voltage drive power supply between the reference potential line Nh2 connected to the bootstrap terminal 4d and the ground line Nd. In the present embodiment, the reference potential line Nh2 is used as an upper drive power supply line (corresponding to the second drive power supply line) of the drive power supply applied to the upper drive circuit 208. Therefore, the bootstrap circuit 15 supplies a boost voltage VBS that serves as a high-voltage drive power source between the upper power supply line Nu of the upper drive circuit 208 and the ground line Nd.

The upper drive circuit 208 operates based on the boost voltage VBS of the bootstrap circuit 15. The upper drive circuit 208 generates potential of high level or low level for driving the upper switching element N2 and N3 based on the control signal input from the control circuit 207, and drives the upper switching element N2 and N3.

The lower drive circuit 9 operates using a regulated power supply voltage VDD generated by a regulated power supply circuit (not shown). The lower drive circuit 9 generates potential of high level or low level for driving the lower switching element N1 based on the control signal input from the control circuit 207, and drives the lower switching element N1.

The analog switch 212 is connected between a common connection point Nm and a reference potential line Nh2. The common connection point Nm connects electrical conduction terminals of upper switching elements N3 and N2. The boost voltage VBS that is different from the applied voltages of the upper power supply line Nu and the ground line Nd is applied to the reference potential line Nh2.

The analog switch 212 is controllable to on or off based on a control signal SW input from the control circuit 207. The analog switch 212 is a switch in which an impedance value larger than the impedance value (impedance at the time of short-circuit) assuming that the upper switching element N2 is short-circuited when the power is turned on by the control circuit 207 is set in advance.

The voltage detection circuit 10 is configured by using a comparator (not shown) operated by the boost voltage VBS of the bootstrap circuit 15 with reference to the ground potential of the ground line Nd. The voltage detection circuit 10 detects the voltage VM at the common connection point Nm of the drains and sources of the plurality of upper switching elements N2 and N3, thereby outputting, to the control circuit 207, a detection result DETP3 that is a result of comparing the voltage VM with the predetermined threshold voltage Vth3 (provided that the boost voltage NBS<the threshold voltage Vth3<the power supply voltage VIN). The voltage detection circuit 10 is provided for determining short-circuit of the upper switching element N3.

The voltage detection circuit 11 is configured by using a comparator (not shown) operated by the boost voltage VBS of the bootstrap circuit 15 with reference to the intermediate node Nc. The voltage detection circuit 11 detects the voltage VM at the common connection point Nm of the drains and sources of the plurality of upper switching elements N2 and N3, thereby outputting, to the control circuit 207, a detection result DETP2 that is a result of comparing the voltage VM with a predetermined threshold voltage Vth4 (provided that the ground voltage<the threshold voltage Vth4<the boost voltage VBS). The voltage detection circuit 11 is provided for determining short-circuit of the upper switching element N2. The other configuration is the same as that of the first embodiment, and hence the description will be omitted.

The normal operation and the operation at the time of short-circuit determination of the above configuration will be described.

During the normal operation periods T11 and T13, the control circuit 207 complementarily turns on and off the upper switching elements N3 and N2 and the lower switching element N1 while keeping the analog switch 212 in the off state. When the control circuit 207 drives the upper switching elements N3 and N2 on and drives the lower switching element N1 off, the power supply voltage VIN is supplied to the filter 5 from the upper power supply line Nu through the upper switching elements N3 and N2.

When the control circuit 207 drives the upper switching elements N3 and N2 off and drives the lower switching element N1 on, a reflux current is conducted between the lower switching element N1 and the filter 5. The control circuit 207 controls the on/off drive of the upper switching elements N3 and N2 and the lower switching element N1 by pulse control (for example, PWM control), so that the output voltage VOUT output to the load 3 can be controlled to a target voltage different from the power supply voltage VIN. The target voltage may be lower than the power supply voltage VIN.

During the short-circuit determination periods T12 and T14, as shown in FIG. 5, the control circuit 207 sets the gate voltage GPu of the upper switching elements N3 and N2 to off level, so that the control circuit 7 drives the plurality of upper switching elements N3 and N2 off, and the control circuit 7 sets the gate voltage GNd of the lower switching element N1 on level, so that the control circuit 7 drives the lower switching element N1 on.

The control circuit 207 changes the analog switch 212 from the off state to the on state. When the analog switch 212 is turned on, the boost voltage VBS of the bootstrap circuit 15 is applied to the common connection point Nm. In this state, the control circuit 207 inspects whether the plurality of upper switching elements N3 and N2 are operating normally on and off, and whether any of the upper switching elements N3 and N2 is short-circuited. When the upper switching elements N3 and N2 are operating normally on and off, both the upper switching elements N3 and N2 are turned off. Thus, the voltage VM at the common connection point Nm becomes approximately equal to the boost voltage VBS of the bootstrap circuit 15.

However, when the upper switching element N3 is short-circuited between the source and drain for some reason, the voltage VM at the common connection point Nm changes so as to be substantially equal to the power supply voltage VIN. Therefore, the voltage detection circuit 10 outputs, to the control circuit 207, a detection result DETN3 indicating that the boost voltage VBS of the bootstrap circuit 15 is changed to the power supply voltage VIN by comparing the voltage VM at the common connection point Nm with the threshold value Vth3. As a result, the control circuit 207 can determine that the upper switching element N3 is short-circuited.

In particular, since the impedance when the upper switching element N3 or N2 is short-circuited is set lower than the impedance when the analog switch 212 is electrically conducted, the voltage VM at the common connection point Nm changes significantly from the reference voltage VH to the power supply voltage VIN. Therefore, the voltage detection circuit 10 can easily detect a change in the voltage VM at the common connection point Nm.

Further, as shown in the short-circuit determination period T14 in FIG. 6, when the upper switching element N2 is short-circuited between the source and drain for some reason, the voltage VM at the common connection point Nm is changed to be equal to the power supply voltage VSW at the intermediate node Nc by the upper switching element P2.

At this time, since the lower switching element N1 is in on state, the voltage VSW of the intermediate node Nc is substantially grounded, and the voltage VM of the common connection point Nm is also substantially grounded. Therefore, the voltage detection circuit 11 outputs, to the control circuit 207, the detection result DETN2 that indicates that the boost voltage VBS of the bootstrap circuit 15 is changed to the ground voltage by comparing the voltage VM at the common connection point Nm with the threshold value Vth4. As a result, the control circuit 207 can determine that the upper switching element N2 is short-circuited.

In particular, since the impedance at the time of short-circuit of the upper switching element N3 or N2 is set lower than the impedance of the analog switch 212, the voltage VM at the common connection point Nm is changed from the boost voltage VBS of the bootstrap circuit 15 to the ground voltage. Thus, the voltage detection circuit 11 can easily detect the change in the voltage VM at the common connection point Nm.

When the control circuit 207 determines that the upper switching element N3 or N2 is short-circuited, the control circuit 7 applies an off-level to the gates of the upper switching elements N3 and N2 and the lower switching element N1 to stop the drive of the upper switching elements N3 and N2 and the lower switching element N1. As a result, the overcurrent flowing inside the switching power supply device 201, that is, the semiconductor integrated circuit device 204 can be cut off, and safety can be maintained.

As described above, according to the short-circuit determination device A of the switching power supply device 201 of the present embodiment, in a state where the plurality of upper switching elements N3 and N2 are driven off and the lower switching element N1 is driven on, the analog switch 212 is turned on. In this configuration, the boost voltage VBS as the reference voltage is biased to the common connection point Nm of the plurality of upper switching elements N3 and N2, and the short-circuit of the plurality of upper switching elements N3 and N2 is determined. As a result, short-circuit of the upper switching element N3 or N2 can be easily detected.

Further, the reference potential line Nh2 is used as the upper drive power supply line of the drive power supply applied to the upper drive circuit 208 that drives the control terminals of the upper switching elements N3 and N2, and the analog switch 212 is connected between the common connection point Nm and the drive power supply line. Therefore, the reference voltage for short-circuit determination can be appropriately applied from the reference potential line Nh2.

According to the short-circuit determination device A of the switching power supply device 201 according to the second embodiment, even when the analog switch 212 biases the boost voltage VBS of the bootstrap circuit 15 to the common connection point Nm, the boost voltage VBS does not decrease due to the influence of the power consumption of the voltage detection circuits 10 and 11 and the upper drive circuit 8. Thus, the boost voltage VBS can be stably maintained, and the short-circuit determination function can be effectively utilized.

Third Embodiment

Figure 7:
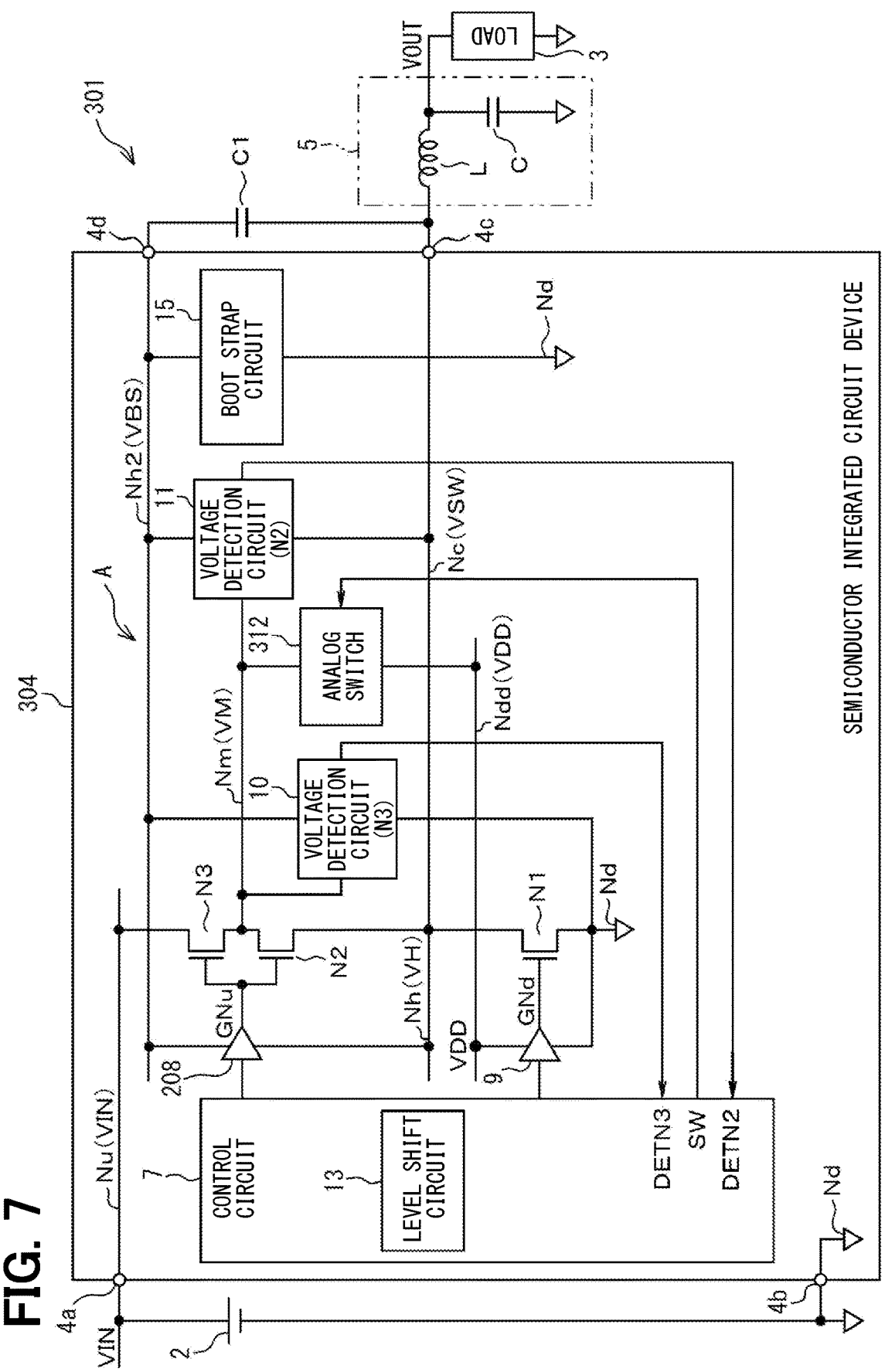
FIG. 7 is an electrical configuration block diagram illustrating a switching power supply device according to a third embodiment.

FIG. 7 shows an explanatory diagram of a third embodiment. In the following description, the same parts as those in the second embodiment will be designated by the same reference numerals, description thereof will be omitted as necessary, and parts different from those in the second embodiment will be described. A semiconductor integrated circuit device 304 constituting a switching power supply device 301 includes an analog switch 312 instead of the analog switch 212, and other configurations are the same as those of the second embodiment.

As shown in FIG. 7, the analog switch 312 is connected between the common connection point Nm and a drive power supply line Ndd (corresponding to the reference potential line, or the first drive power supply line), and is controllable to on or off based on a control signal SW input from the control circuit 7. The drive power supply line Ndd is an upper drive power supply line of the drive power supply applied to the lower drive circuit 9 that drives the control terminal of the lower switching element N1. Since the regulated power supply voltage VDD is supplied to the drive power supply line Ndd, the control circuit 7 can maintain the voltage of the common connection point Nm on the regulated power supply voltage VDD side by controlling the analog switch 312 on.

In this case, when the upper switching element N3 is short-circuited between the drain and source, the voltage detection circuit 10 outputs, to the control circuit 7, a detection result DETN 3 indicating that the voltage VM at the common connection point Nm is changed from the regulated power supply voltage VDD to the power supply voltage VIN by comparing the voltage of the common connection point Nm with the threshold voltage Vth3. As a result, the control circuit 7 can determine that the upper switching element N3 is short-circuited.

Further, when the upper switching element N2 is short-circuited between the drain and source, the voltage detection circuit 11 outputs, to the control circuit 7, the detection result DETN2 indicating that the voltage VM at the common connection point Nm is changed from the regulated power supply voltage VDD to the ground voltage. As a result, the control circuit 7 can determine that the upper switching element N2 is short-circuited.

Also in the present embodiment, the same effect as the second embodiment is achieved. Further, since the regulated power supply voltage VDD is used as the reference voltage, short-circuit can be stably determined.

Fourth Embodiment

Figure 8:
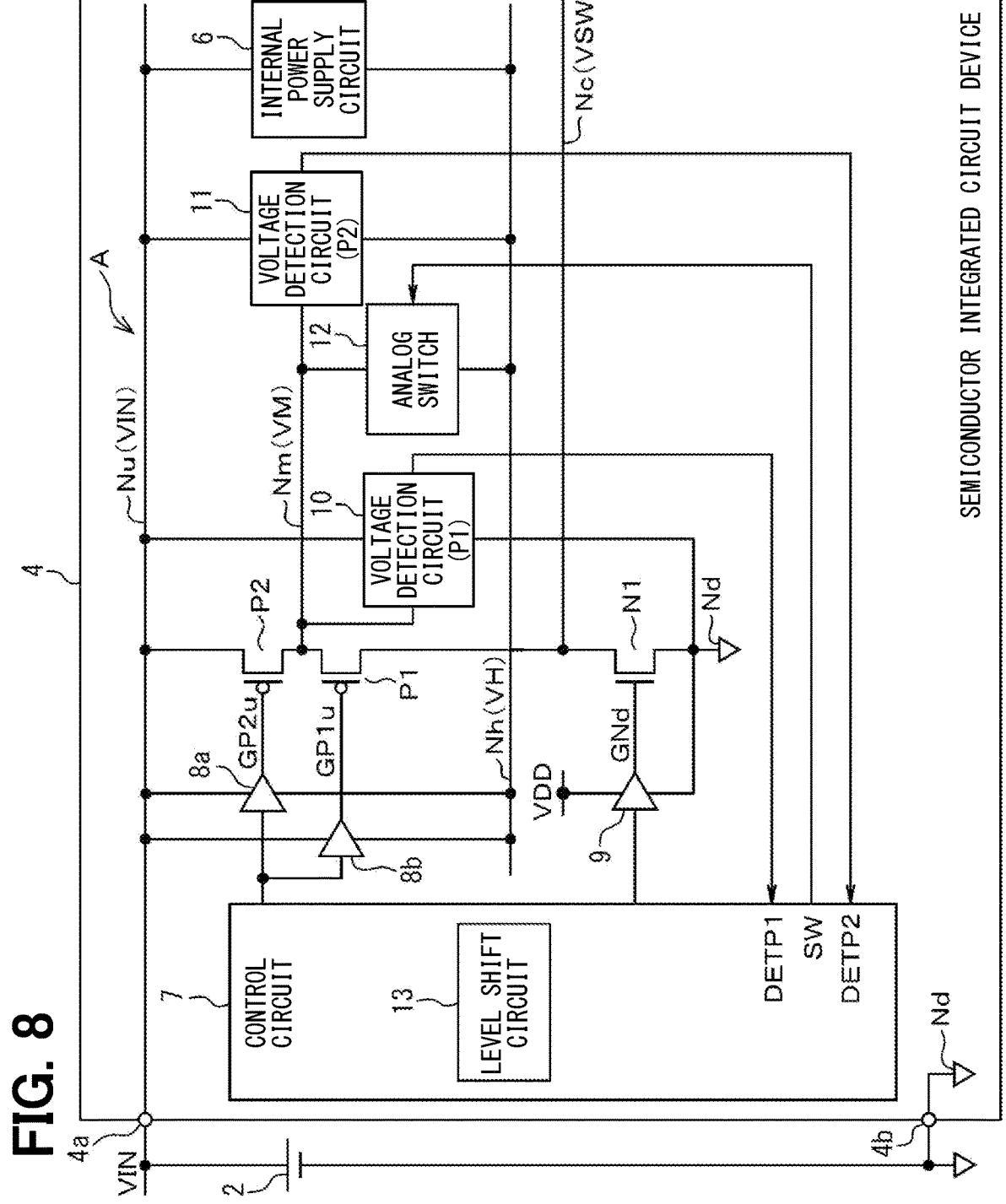
FIG. 8 is an electrical configuration block diagram illustrating a switching power supply device according to a fourth embodiment.

FIG. 8 shows an explanatory diagram of a fourth embodiment. In the configuration shown in FIG. 1 of the first embodiment, when the upper switching element P2 or P1 of the switching power supply 1 is short-circuited between the source and drain for some reason, a high voltage exceeding the withstand voltage characteristic may be applied to the upper switching element P2 or the like. Assuming such a situation, as shown in FIG. 8, it is desirable that the plurality of upper switching elements P2 and P1 are driven by upper drive circuits 8a and 8b, respectively. Each of the upper drive circuits 8a and 8b operates by the power supply voltage applied between the upper power supply line Nu and the reference potential line Nh.

In this case, even when the upper switching element P2 cannot be driven due to failure in the upper drive circuit 8a and the upper switching element P2 is short-circuited between the drain and source, the upper drive circuit 8b other than the upper drive circuit 8a can independently drive the upper switch element P1 on and off.

As a result, the control circuit 7 can drive the upper switching element P1 off by the upper drive circuit 8b. For example, even when a high power supply voltage VIN continues to be applied from the voltage source 2 to the switching power supply device 1, the electrical conduction to the lower switching element N1, the load 3, and the like can be immediately cut off, and heat generation can be reduced.

Fifth Embodiment

Figure 9:
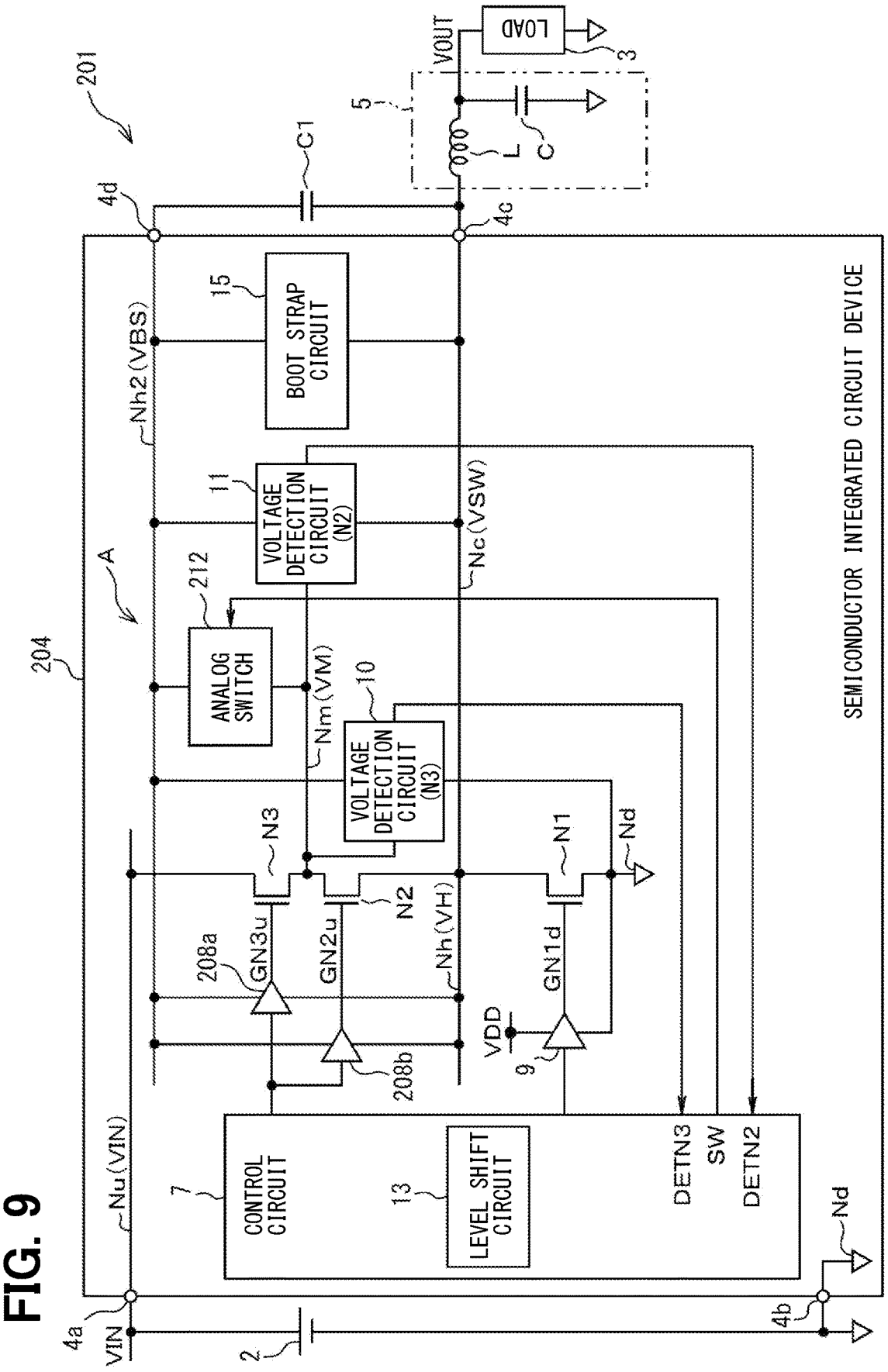
FIG. 9 is an electrical configuration block diagram illustrating a switching power supply device according to a third embodiment.

FIG. 9 shows an explanatory diagram of a fifth embodiment. In the configuration shown in FIG. 4 of the second embodiment, when the upper switching element N3 or N2 of the switching power supply device 201 is short-circuited between the source and drain for some reason, a high voltage exceeding the withstand voltage characteristic may be applied to the upper switching element N3 or N2. Assuming such a situation, as shown in FIG. 9, it is desirable that the plurality of upper switching elements N3 and N2 are driven by upper drive circuits 208a and 208b, respectively.

In this case, even when the upper switching element N3 cannot be driven due to failure in the upper drive circuit 208a and the upper switching element N3 is short-circuited between the drain and source, the upper drive circuit 208b other than the upper drive circuit 208a can independently drive the upper switch element N2 on and off.

As a result, the control circuit 7 can drive the upper switching element N2 off by the upper drive circuit 208b. For example, even when a high power supply voltage VIN continues to be applied from the voltage source 2 to the switching power supply device 201, the electrical conduction to the lower switching element N1, the load 3, and the like can be immediately cut off, and heat generation can be reduced.

Other Embodiments

The present disclosure is not limited to the configuration example of the above-described embodiments, and various modifications or extensions are possible. Further, for example, it is also possible to apply the configurations of the above-described embodiments in combination.

Each of the lower switching element N1, the upper switching elements N2 and N3 can be applied to any of various N-type semiconductor switch such as a N-channel MOSFET, a NPN-type bipolar transistor, and an IGBT (insulated gate bipolar transistor). Each of the upper switching elements P1 and P2 can be applied to any of various P-type semiconductor switch such as a P-channel MOSFET and a PNP-type bipolar transistor. In the semiconductor integrated circuit device 4, each upper switching element P1, P2, N3, N2 may be provided externally and connected as an external element.

When applied to MOSFETs, the electrical conduction terminal corresponds to a drain and a source, and the control terminal corresponds to a gate. When applied to a bipolar transistor, the electrical conduction terminal corresponds to a collector and an emitter, and the control terminal corresponds to a base. When applied to an IGBT, the electrical conduction terminal corresponds to a collector and an emitter, and the control terminal corresponds to a gate.

Although the embodiments applied to the step-down type switching power supply device 1, 201, and 301 have been described, the step-up type switching power supply device may be applied.

Although the embodiments in which the impedance when the analog switch 12, 212, or 312 is electrically conducted is set to be larger than the impedance when the upper switching element P1, P2, N3, or N2 is short-circuited have been described, the present disclosure is not limited to the configuration above. For example, the impedance when the analog switch 12, 212, or 312 is electrically conducted may be set to be equal to or lower than the impedance when the upper switching element P1, P2, N3, or N2 is short-circuited.

In addition, the reference numerals in parentheses described in the claims simply indicate correspondence to the concrete means described in the embodiments, which is an example of the present disclosure. That is, the technical scope of the present invention is not necessarily limited thereto. A part of the above-described embodiment may be dispensed/dropped as long as the problem identified in the background is resolvable. In addition, various modifications from the present disclosure in the claims are considered also as an embodiment thereof as long as such modification pertains to the gist of the present disclosure.

Although the present disclosure is described based on the above embodiments, the present disclosure is not limited to the disclosure of the embodiment and the structure. The present disclosure encompasses various modifications and variations within the scope of equivalents. In addition, various modes/combinations, one or more elements added/subtracted thereto/therefrom, may also be considered as the present disclosure and understood as the technical thought thereof.

What is claimed is:

1. A short-circuit determination device provided in a switching power supply device configured to convert a power supply voltage applied between an upper power supply line and a lower power supply line and output the power supply voltage to a load through an intermediate node, wherein
the switching power supply device includes
a plurality of upper switching elements each having an electrical conduction terminal and a control terminal, the electrical conduction terminals connected in series between the upper power supply line and the intermediate node, and the control terminals driven at a same level as each other, and
a lower switching element having an electrical conduction terminal connected between the lower power supply line and the intermediate node, and the lower switching element and the plurality of upper switching elements being connected in series,
the short-circuit determination device comprising:
an analog switch connected between a common connection point (Nm) to which the electrical conduction terminals of the plurality of upper switching elements are commonly connected and a reference potential line having a reference voltage different from a voltage at the upper power supply line and a voltage at the lower power supply line; and
a short-circuit determination circuit configured to determine a short-circuit of each of the plurality of upper switching elements based on a detection of a potential at the common connection point by biasing the reference voltage to the common connection point by turning on the analog switch in a state where the plurality of upper switching elements are turned off and the lower switching element is turned on.

2. The short-circuit determination device according to claim 1, wherein:
each of the plurality of upper switching elements is provided by an N-type semiconductor switch;
the lower switching element includes a control terminal;
the switching power supply device includes a drive circuit that drives the lower switching element through the control terminal of the lower switching element;
the reference potential line is provided as a first drive power supply line that supplies a drive power supply to the drive circuit; and
the analog switch is connected between the common connection point and the first drive power supply line.

3. The short-circuit determination device according to claim 1, wherein:
each of the plurality of upper switching elements is provided by an N-type semiconductor switch;
the switching power supply device includes a drive circuit that drives the plurality of upper switching elements through the control terminals;
the reference potential line is provided as a second drive power supply line that supplies a drive power supply to the drive circuit; and
the analog switch is connected between the common connection point and the second drive power supply line.

4. The short-circuit determination device according to claim 1, wherein:
each of the plurality of upper switching elements is provided by a P-type semiconductor switch;
the switching power supply device includes a drive circuit that drives the plurality of upper switching elements through the control terminals;
the reference potential line is provided as a third drive power supply line that supplies a drive power supply to the drive circuit; and
the analog switch is connected between the common connection point and the third drive power supply line.

5. The short-circuit determination device according to claim 1, wherein:
the switching power supply device includes a plurality of upper drive circuits that respectively drive the plurality of upper switching elements.

6. The short-circuit determination device according to claim 1, wherein:
impedance of the analog switch that is turned on is greater than impedance of the upper switching element when the electrical conduction terminal is short-circuited.

7. The short-circuit determination device according to claim 1, wherein:
the switching power supply device is a step-down type.

8. A switching power supply device comprising:
an upper power supply line and a lower power supply line, a power supply voltage being applied between the upper power supply line and the lower power supply line;
an intermediate node connected to a load;
a plurality of upper switching elements each having an electrical conduction terminal and a control terminal, the electrical conduction terminals connected in series between the upper power supply line and the intermediate node, the control terminals driven at a same level as each other, and the plurality of upper switching elements configured to convert the power supply voltage;
a lower switching element having an electrical conduction terminal connected between the lower power supply line and the intermediate node, and the lower switching element and the plurality of upper switching elements being connected in series;
an analog switch connected between a common connection point to which the electrical conduction terminals of the plurality of upper switching elements are commonly connected and a reference potential line having a reference voltage different from a voltage at the upper power supply line and a voltage at the lower power supply line; and
a short-circuit determination circuit configured to determine a short-circuit of each of the plurality of upper switching elements based on a detection of a potential at the common connection point by biasing the reference voltage to the common connection point by turning on the analog switch in a state where the plurality of upper switching elements are turned off and the lower switching element is turned on.

* * * * *